United States Patent
Rüb et al.

(10) Patent No.: US 8,375,886 B2
(45) Date of Patent: Feb. 19, 2013

(54) DEVICES AND PROCESS FOR THE PRODUCTION OF SANDWICH COMPOSITE ELEMENTS

(75) Inventors: Thomas Rüb, Leverkusen (DE); Uwe Kuenzel, Leverkusen (DE)

(73) Assignee: Bayer MaterialScience AG, Leverkusen (DE)

( * ) Notice: Subject to any disclaimer, the term of this patent is extended or adjusted under 35 U.S.C. 154(b) by 1066 days.

(21) Appl. No.: 11/803,794

(22) Filed: May 15, 2007

(65) Prior Publication Data

US 2007/0267443 A1 Nov. 22, 2007

(30) Foreign Application Priority Data

May 16, 2006 (DE) .................. 10 2006 022 760

(51) Int. Cl.
- *B05C 7/06* (2006.01)
- *B05C 5/00* (2006.01)
- *B29B 44/20* (2006.01)
- *B29C 44/46* (2006.01)

(52) U.S. Cl. .......... 118/325; 118/313; 118/315; 425/4 C

(58) Field of Classification Search .......... 118/313–316, 118/321, 323, 325; 156/71, 78, 166; 427/373, 427/427.1, 427.3; 425/4 R, 4 C
See application file for complete search history.

(56) References Cited

U.S. PATENT DOCUMENTS

| | | | | |
|---|---|---|---|---|
| 3,009,209 A | * | 11/1961 | Weinbrenner et al. | 264/54 |
| 4,209,557 A | * | 6/1980 | Edwards | 427/373 |
| 4,260,266 A | | 4/1981 | Rudhart et al. | |
| 4,624,213 A | | 11/1986 | Long et al. | |
| 5,226,962 A | * | 7/1993 | Burke et al. | 118/74 |
| 2005/0222289 A1 | | 10/2005 | Miller | |

FOREIGN PATENT DOCUMENTS

| | | |
|---|---|---|
| DE | 1 609 668 | 3/1972 |
| DE | 2828505 | 1/1980 |
| DE | 3102132 | 8/1982 |
| DE | 3151511 A1 | 7/1983 |
| EP | 0553695 A2 | 8/1993 |
| GB | 1160891 | 8/1969 |
| GB | 1160892 | 8/1969 |
| GB | 1197221 A | 7/1970 |
| JP | 62-53766 | 3/1987 |

* cited by examiner

*Primary Examiner* — Yewebdar Tadesse

(74) *Attorney, Agent, or Firm* — Novak Druce Connolly Bove Lodge + Quigg LLP

(57) ABSTRACT

The invention relates to an application device for the simultaneous and uniform discharge of a foamable reaction mixture on to a surface, a device for the production of sandwich composite elements and a process for the continuous or discontinuous production of sandwich composite elements, especially foam composite elements with rigid and flexible outer layers.

6 Claims, 3 Drawing Sheets

DEVICES AND PROCESS FOR THE PRODUCTION OF SANDWICH COMPOSITE ELEMENTS

Priority is claimed under 35 U.S.C. §119 to German patent application No. 102006022760.3, filed May 16, 2006.

BACKGROUND OF THE INVENTION

The invention relates to an application device for the simultaneous and uniform application of a foamable reaction mixture on to a surface, a device for the production of sandwich composite elements and a process for the continuous or discontinuous production of sandwich composite elements, especially foam composite elements with rigid and flexible outer layers.

For a long time, there has been a need for devices for the continuous production of sandwich composite elements in which the production rate can be increased to speeds of more than 15 m/min, preferably up to 60 m/min.

Up to now, oscillating mixing heads have been used for the continuous production of sandwich composite elements. In the known processes, the mixing head performs an oscillating movement across the width of the bottom outer layer and applies the still liquid reaction mixture on to the bottom outer layer by means of a casting rake or fan or spoon nozzle, which is arranged at a right angle to the mixing head and parallel to the bottom outer layer.

The mixing head is fixed to a guide rail, the so-called portal, above the bottom outer layer and is accelerated with the aid of electric motors and slowed before the reversal points. The raw materials for foaming are fed into the mixing head through flexible tubing. In addition, in some cases hydraulic or pneumatic hoses lead into the mixing head. The raw materials for foaming are introduced into the mixing head through nozzles and are mixed.

The reaction mixture then flows into the casting rake and exits through the regularly spaced holes. A uniform distribution of the reaction mixture oblique to the direction of transport is achieved by the length of the casting rake and its holes, as well as by the oscillating movement of the mixing head.

After the application, the reaction mixture foams up and rises as far as the top outer layer. During the foaming process it bonds the two outer layers before the foam solidifies and cures.

This production process is physically limited in terms of the production rate. Even if sufficiently strong motors, guide rails, hoses, mixing heads and casting rakes or fan or spoon nozzles were used, the reaction mixture would be taken out beyond the sides of the outer layers as a result of excessively high centrifugal forces at the reversal points. According to the prior art, production rates of more than 15 m/min cannot be achieved in the continuous production of sandwich composite elements using this application technique.

The technique of bringing the production rate to 60 m/min using stationary mixing head technology and rigid discharge systems is sufficiently well known. This process known as US technology (high-speed machines) consists substantially of three identical metering lines with separate feed and separate mixing heads and discharge systems. However, this technology does not have a distributor head such as that employed in the present invention. The known process is disadvantageous in that the reaction mixture leaving each of the individual mixing heads is also subject to different physical conditions in terms of pressure and temperature, which becomes apparent in the foam produced as reductions in product quality, such as uneven surface, smaller cell, and different thermal conductivity values due to reaction kinetics that differ from point to point.

SUMMARY OF THE INVENTION

It is an object of the present invention to provide a process which overcomes the disadvantages of limited application rate.

This object is achieved by using the application device of the present invention for the production of foams in which the foam-forming mixture is simultaneously applied and foamed up evenly over the reaction area. The application device of the present invention includes: a mixing head, a distributor head, at least 3 or more flexible discharge lines attached to the distributor head, which are affixed to a frame transverse to the direction of discharge.

DETAILED DESCRIPTION OF THE INVENTION

Figure 1:
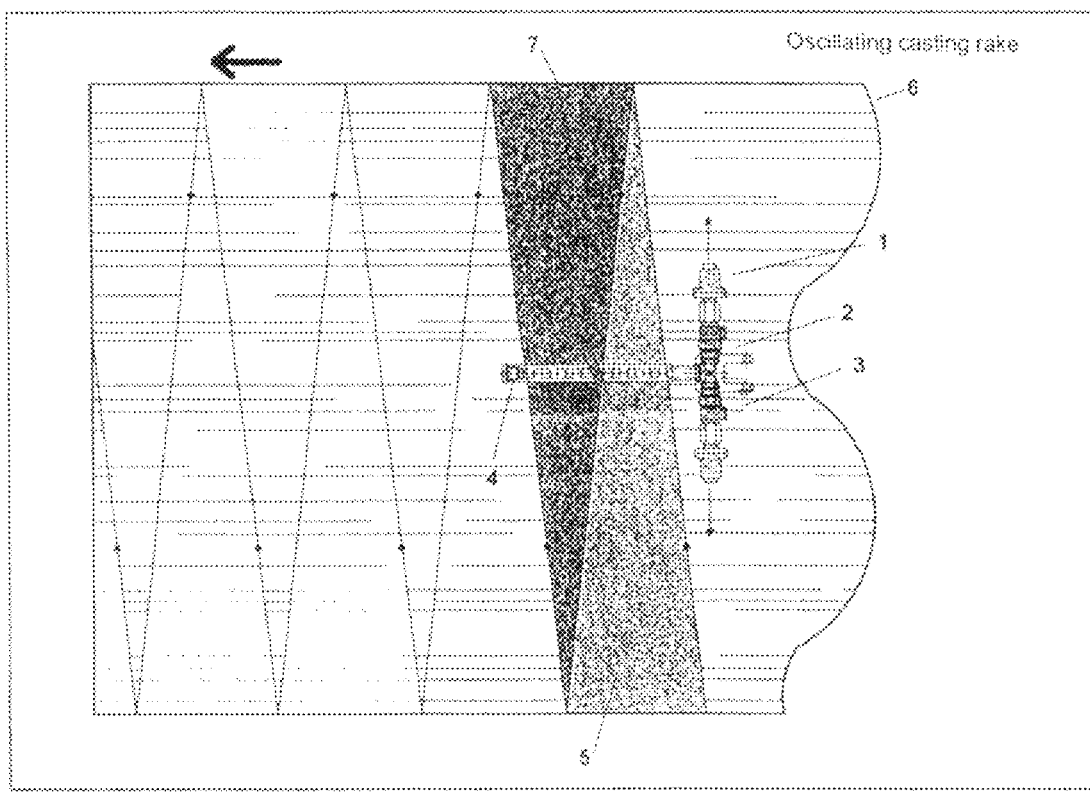
FIG. 1 is a diagrammatic representation of the application of a polyurethane-forming reaction mixture application using an oscillating mixing head and casting rake.

The present invention relates to a process for application of a polyurethane foam-forming reaction mixture using the device of the present invention in which the foam-forming mixture is simultaneously applied and foamed up evenly over the reaction area. The application device of the present invention includes: a mixing head, a distributor head, at least 3 or more flexible discharge lines attached to the distributor head, which are affixed to a frame transverse to the direction of discharge.

It is advantageous if the application device according to the invention includes at least 3 discharge lines of equal length, provided with equal cross sections and composed of the same material attached to the distributor head.

The application device of the present invention is particularly advantageous if the positioning of the discharge lines is adapted to the panel geometry and the reaction mixture being discharged is distributed evenly across the entire width of the bottom outer layer (or facing) of the reaction area.

The application device according to the invention is advantageous if the discharge lines are attached to the frame in such a way that the reaction mixture is applied on to the bottom outer layer in the direction of transport of the reaction belt.

The application device according to the invention is advantageous if the discharge lines are attached to the frame in such a way that the reaction mixture is applied on to the bottom outer layer against the direction of transport of the reaction belt.

Another embodiment of the invention is a device for the production of sandwich composite elements in which at least two feed devices for a top and a bottom outer layer or facing material, a rotating upper belt to guide the top outer layer, a rotating lower belt to guide the bottom outer layer, to which an application device according to the invention for a foamed core layer, a molding section and a cutting device are connected in series.

The device according to the invention for the production of sandwich composite elements is advantageous if a foamed polyurethane (PU) core layer is used.

Another embodiment of the invention is a process for the production of foamed sandwich composite elements, wherein the device according to the invention for the production of sandwich composite elements is used and one or both of the components mixed together in the mixing head are mixed with an inert gas, either in advance or in the mixing head itself.

The process according to the invention is advantageous if the chemically inert gas is selected from air, nitrogen, carbon dioxide and noble gases such as argon and helium. Air is preferably used as the chemically inert gas.

In the application device according to the invention, a mixing head is also attached to a frame above the bottom outer layer, this frame being non-movable so that different reaction profiles are possible for the production of products of different thicknesses. To the mixing head, in which the individual foaming components are mixed together, a distributor head is affixed. This distributor head possesses at least 3, and a maximum of 8, discharge lines, the length, cross section and material of which are preferably all the same. This has the advantage that, on contact with the bottom outer layer, the foaming behavior of the still liquid reaction mixture has advanced to the same degree at every point of contact, which leads to a particularly uniform foaming of the product being produced. This advantage is favored not only by the same length, cross section and material of the discharge lines but also by the fact that the entire mixture to be applied comes out of one and the same mixing head. Any material known to the person skilled in the art that does not react with the reaction mixture to be foamed and to which the reaction mixture does not adhere unusually strongly can be used as the discharge line. Examples of preferred materials for the discharge line are steel, aluminum, stainless steel, polyethylene (PE), polypropylene (PP), polyvinyl chloride (PVC), polyethylene terephthalate (PET), rubber, polytetrafluoroethylene (PTFE) and polyurethane (PU). Rubber is to be understood as any flexible rubber known to the person skilled in the art that can be processed into a feed line, with nitrile butadiene rubber (NBR) being preferred. Particularly preferred are flexible materials such as PE, PP, PET and PVC. The discharge lines are arranged and fixed on a rigid frame arranged above the top outer layer in transverse direction to the direction of transport of the conveyor belt in such a way that they are adapted to the panel geometry and a uniform application across the width of the bottom outer layer is guaranteed. The discharge lines are advantageously arranged above the bottom outer layer in such a way that the reaction mixture is applied on to the bottom outer layer such that the non-wetted areas between the individual areas of application on the bottom outer layer are the same size. During foaming, the gaps are closed so that a uniform foaming of the composite elements is guaranteed. For fine adjustment, the discharge lines are movable on the rigid frame in transverse direction to the direction of transport of the conveyor belt. Furthermore, the discharge lines are attached to the frame in such a way that the reaction mixture makes contact with the bottom outer layer either in or against the direction of transport of the conveyor belt. Whether the reaction mixture makes contact with the bottom outer layer in or against the direction of transport of the conveyor belt depends on the rate of discharge from the discharge lines and on the rate of travel of the conveyor belt, and possibly on the viscosity of the reaction mixture. At a rate of discharge of 1.2 to 2 m/min and a rate of travel of 20 to 60 m/min, it is advantageous if the application of the reaction mixture takes place against the direction of transport. At a rate of discharge of 1.2 to 2 m/min and a rate of travel of up to 20 m/min, application in the direction of transport of the conveyor belt is advantageous.

In a particularly preferred embodiment of the present invention, both the mixing head and the distributor head together with the discharge lines can be arranged and fixed so that products with decreasing thickness in the direction transverse to the direction of transport of the conveyor belt, or with constantly changing thickness ratios, are produced. The non-wetted areas between the individual areas of application on the bottom outer layer can be made to decrease in a linear fashion or constantly vary in size. During foaming, these gaps are closed so that a desired irregular foaming in the height of the products is made possible.

This type of arrangement makes it possible to do away with the portal which is essential for the oscillating casting rake or fan or spoon nozzle. Moreover, with this arrangement, the production rates now depend only on the speed of the conveyor belt or the delivery performance of the foaming machine. Rates of more than 15 m/min up to a maximum of 60 m/min can be achieved with this arrangement. Another advantage of the device of the present invention compared with processes that have to employ several mixing heads is that, because only one mixing head is used, no variations can occur due to different processing pressures, temperatures or similar processing parameters, leading to a reduction in production safety and product quality issues.

Any of the mixing heads known to those skilled in the art can be employed as the mixing head for the device of the present invention if they are suitable for use in foaming of the polyol component and polyisocyanate component to produce polyurethane sandwich composite elements. The chemically inert gas can be added to the reaction mixture in the mixing head or can already be mixed with one or both reaction components in advance, to prevent possible blockage of the discharge lines. Examples of suitable chemically inert gases include: nitrogen, air, carbon dioxide and the noble gases such as argon and helium. Instead of or in addition to a gas, other constituents can be mixed into the reaction components. Examples of such additional constituents which may be added to the reaction components or mixture in the mixing head include: graphite, polyurethane flour, melamine, quartz sand, $Al_2O_3$, talcum and nanocomposites, such as layer silicates, nanotubes, nanosand.

Examples of materials suitable for construction of the distributor head include: steel, stainless steel, aluminum and plastics. In any event, the material selected must withstand the pressures and temperatures prevailing in the mixing head in the range of 0.5 to 3 bar and 20 to 40° C. The geometry of the distributor head is preferably chosen so that the length of the path from the distributor inlet to the respective outlets to the discharge lines is equal. It is also advantageous if the cross section of the distributor head outlets is identical at all of the distributor head outlets. However, the cross section of the distributor head inlet can also be larger than the respective distributor head outlets.

Figure 3:
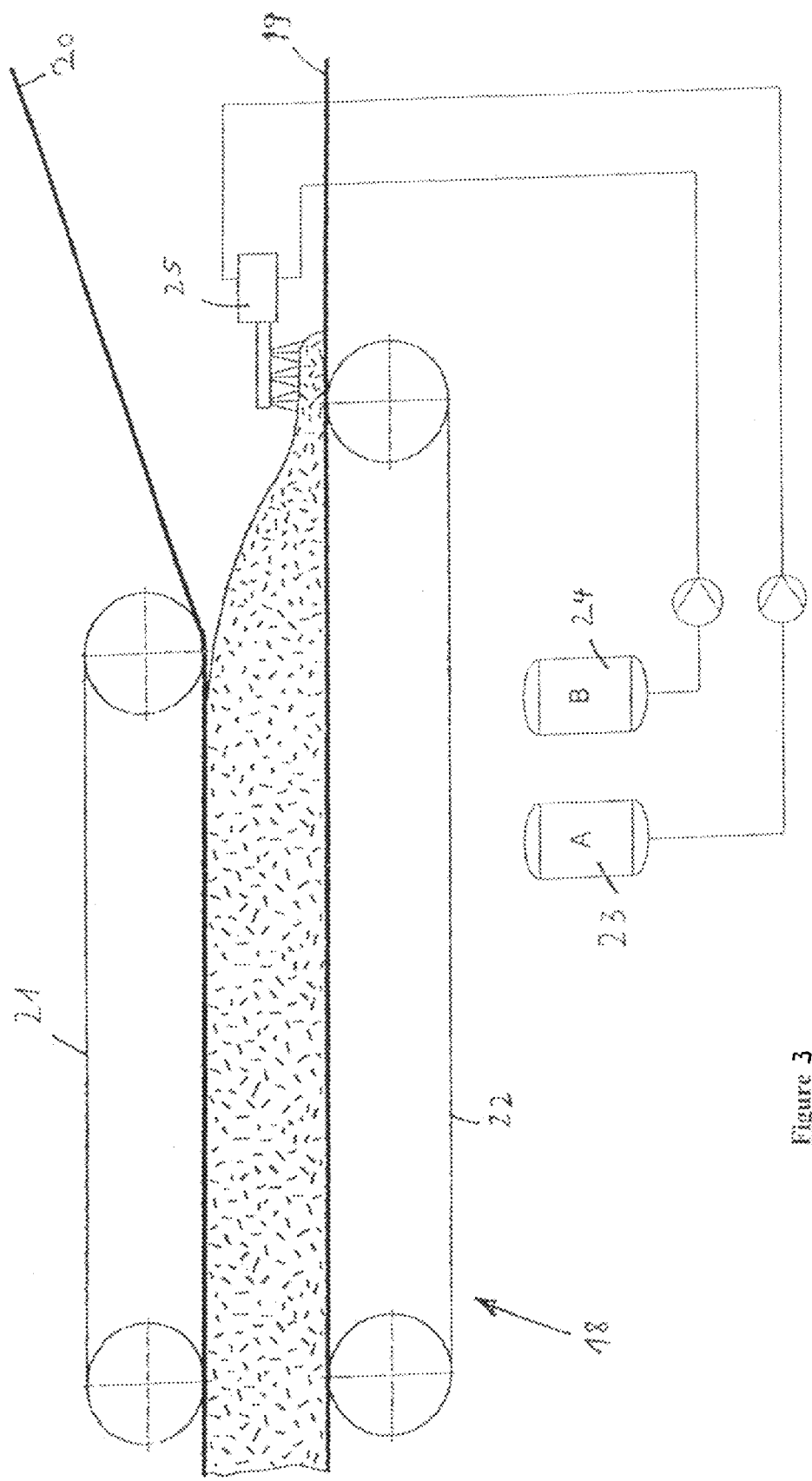
FIG. 3 is a diagrammatic representation of the continuous production process of composite elements with flexible or rigid outer layers.

The application device of the present invention can be a component of another device, which is used to produce sandwich composite elements. The production of polyurethane sandwich elements (panels) generally takes place in a continuous process. In this process, the panels are produced continuously on so-called double conveyor belts in thicknesses of usually approx. 20 to 240 mm. However, thicknesses of less than 20 mm and more than 240 mm are also possible. A double conveyor belt of this type conventionally consists of a rotating upper belt to guide the top outer layer, a rotating lower belt to guide the bottom outer layer, a feed device for the top outer layer, a feed device for the bottom outer layer, a molding section, within which the polyurethane reaction mixture foams up and fully reacts between the top outer layer and the bottom outer layer, a cutting device for the panel produced and a metering station with a mixing head to apply the polyurethane reaction mixture on to the bottom outer layer. A double conveyor belt according to the prior art is illustrated in FIG. 3.

The arrangement of the individual elements for a continuous production process for sandwich composite elements is known from the prior art, e.g. in DE-A 1 247 612 and DE-A 1 609 668.

Within the framework of the present invention, a sandwich composite element means a composite element which is made up at least of two outer layers with a core layer between them.

All materials known to the person skilled in the art can be used as the core layer. Fiberboards of mineral fibers or boards of rigid foam, such as polyurethane or polyisocyanurate (PIR) rigid foam, polystyrene foam, phenolic resin foam, are preferred.

Preferred sandwich composite elements include at least two outer layers of rigid or flexible material and a core layer of a foam, such as a PU rigid foam. The term PU rigid foam(s) as used herein means those rigid foams that are based on polyurethane, polyurea and polyisocyanurate compounds.

Rigid foams based on polyurethane and/or polyisocyanurate are preferably selected as the core layer. For the production of rigid foams containing polyurethane and/or polyisocyanurate groups, any of the compounds known to the person skilled in the art with NCO-containing compounds that are reactive towards OH compounds can be used. Examples of suitable isocyanates include: aliphatic, cycloaliphatic, araliphatic, aromatic and heterocyclic polyisocyanates, preferably diphenylmethane diisocyanate (MDI) or polyphenyl polymethylene polyisocyanates, polyisocyanates having carbodiimide groups, urethane groups, allophanate groups, isocyanurate groups, urea groups or biuret groups, most preferably based on polyphenyl polymethylene polyisocyanate. Examples of suitable compounds with at least two hydrogen atoms that are reactive towards isocyanates having a molecular weight in the range of 400 to 10,000 g/mol include compounds having amino groups, thiol groups, hydroxyl groups or carboxyl groups. In addition, the use of suitable NCO prepolymers, produced by the reaction of polymeric MDI with aliphatic or aromatic polyether polyols or polyester polyols (e.g., polyether polyols or polyester polyols having 1 to 4 hydroxyl groups with a number-average molecular weight of 60 to 4000) is possible.

The production of the foams takes place using the conventional auxiliary substances and additives known to the person skilled in the art, such as catalysts, blowing agents, crosslinking agents, flame retardants, foam stabilizers, flow improvers, inhibitors and optionally solid additives to improve thermal conductivity and flame protection.

Any of the materials known to the person skilled in the art can be used as materials for the outer layers. Metals such as steel (galvanized and/or lacquered), aluminum (lacquered and/or anodized), copper, stainless steel, or non-metals, such as reinforced, unreinforced and/or filled plastics, e.g., polyvinyl chloride or based on polyester, or glass fibers, impregnated cardboard, paper, wood, bitumen-impregnated glass fiber fleece and mineral glass fiber fleece are preferred.

The outer layers can, for example, be coated with a lacquer.

Combinations of the outer layers on the respective sides of the panel produced from the above-mentioned materials are also suitable as outer layers.

Composite elements of this type based on different outer layers (rigid or flexible) and a core layer of polyurethane rigid foam are known from the prior art and are also referred to as metal composite elements and insulating board. Other additional layers can also be provided between the core layer and the outer layers.

Examples of applications for these composite elements with rigid outer layers are plain or lined wall panels and profiled roof panels for industrial hall construction and cold storage construction. The composite elements are also employed as truck bodies, hall doors and gates as well as in container construction. Insulating boards, composite elements with flexible outer layers, are employed as insulating materials in roofs, external walls and as floorboards.

The production of these composite elements by a continuous or discontinuous process is known. For this purpose, the still liquid reaction mixture is applied on to the bottom outer layer using the application device according to the invention. The reaction mixture, which is now foaming up slowly, is transported on the bottom outer layer by means of a lower belt into the molding section which is held by an upper and a lower belt. The foaming reaction mixture reaches the top outer layer and thus bonds the two outer layers together. Within the molding section in which the thickness for the product to be made is pre-set by the upper and lower belt, the foam solidifies and, after passing through the molding section, is cut into lengths by means of a cutting device so that the panels thus produced are cut to the desired lengths.

The invention will be explained below in more detail with reference to the Figures.

FIG. 1 shows a device for applying a still liquid reaction mixture 5 to a bottom outer layer 6. The application of the liquid reaction mixture 5 takes place with the aid of a mixing head 2, which is affixed above the bottom outer layer 6 on a guide rail, the so-called portal (not shown), and a casting rake 4 connected to the mixing head 2. The mixing head 2 exhibits additional holes 3, which act as feed apertures for the components to be mixed in the mixing head 2. Pneumatic cylinder 1 ensures sufficient nozzle tension. The casting rake 4, which exhibits holes arranged one behind the other along the direction of transport, from which the still liquid reaction mixture 5 is applied on to the outer layer 6, is attached to the mixing head 2 at right angles and parallel to the bottom outer layer 6. The mixing head 2 itself is moved in an oscillating motion across the width of the outer layer 6 by means of electric motors (not shown), such that the application of the reaction mixture 5 takes place obliquely on the outer layer 6 because of the continuous movement of the outer layer 6 in the direction of transport. The electric motors accelerate the mixing head 2 together with the attached casting rake 4 to the reversal points 7, located at each end of the width expanse of the outer layer 6 (only one reversal point is shown), the mixing head 2 being braked again shortly before reaching the reversal point 7 to be able to achieve uniform application across the entire width of the outer layer 6 and to avoid the width of the outer layer 6 being overshot as a result of the flow forces arising.

Figure 2:
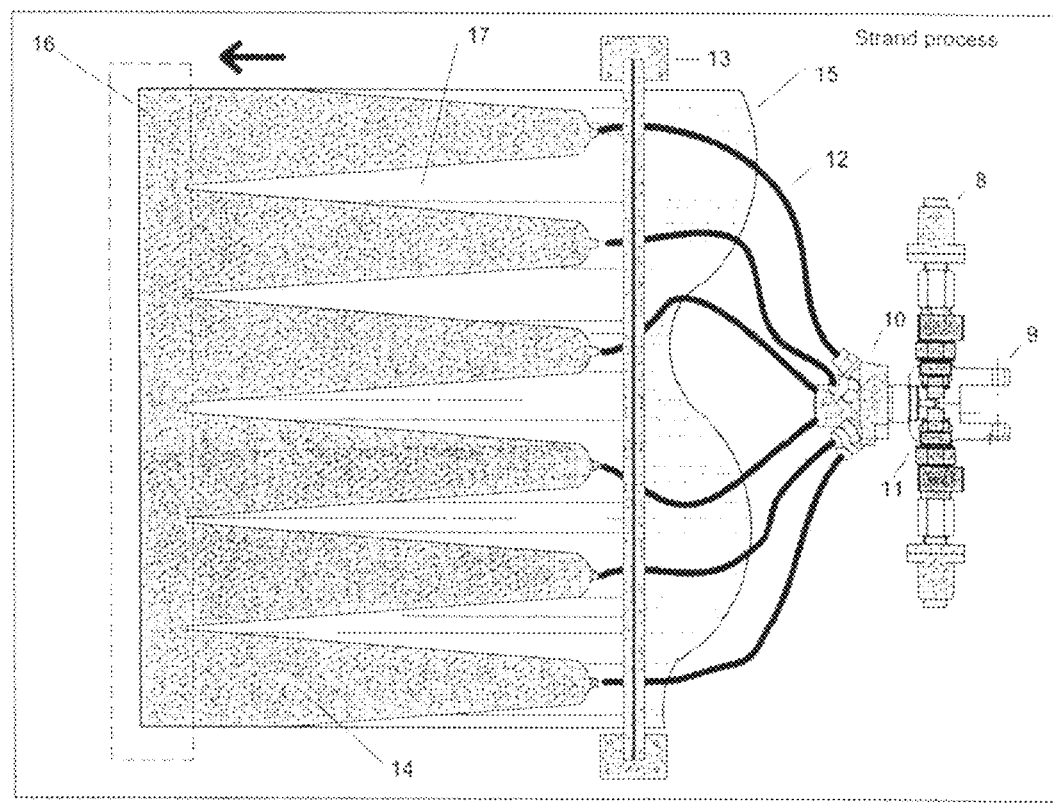
FIG. 2 is a diagrammatic representation of the application of a polyurethane-forming reaction mixture using the device of the present invention containing mixing head with attached distributor head.

FIG. 2 shows the device of the present invention for applying a still liquid reaction mixture 14 on to a bottom outer layer 15. Here too, the application device contains a mixing head 9, which is arranged above the bottom outer layer 15 and contains additional holes 11 as feed apertures for the reaction components. A distributor head 10, from which 6 discharge lines 12 of equal length and provided with equal diameters and made of the same material are affixed, is attached to the mixing head 9. The discharge lines 12 are affixed across the entire width of the bottom outer layer 15 on the bottom of a frame 13 running transverse to the direction of transport in such a way that a uniform application on to the outer layer can take place in the direction of transport of the conveyor belt. Pneumatic cylinder 8 ensures sufficient nozzle tension. The frame 13 is arranged rigidly above the bottom outer layer 15. For fine adjustment, the discharge lines 12 can change their position on the frame 13 transverse to the direction of transport (not shown). The embodiment of the application device according to the invention illustrated in FIG. 2 provides an arrangement of the discharge lines 12 on the frame 13 adapted to the panel geometry, which makes it possible for the still liquid reaction mixture 14 to make contact with the bottom outer layer 15 in such a way that the uncovered areas 17 of the bottom outer layer 15 between the covered areas are the same size to guarantee uniform foaming across the entire width of the outer layer 15. During the further foaming of the liquid reaction mixture 14, the gaps 17 are thus closed uniformly 16. In another embodiment of the invention, the discharge lines 12 can also be attached to the frame 13 in such a way that the application of the reaction mixture 14 on to the bottom outer layer 15 can take place against the direction of transport of the conveyor belt. In another embodiment of the present invention, the discharge lines 12 can also be arranged on the frame 13 in such a way that the thickness of the sandwich composite element being produced in each case varies across the width transverse to the direction of transport of the conveyor belt.

FIG. 3 shows a device 18 for the production of polyurethane sandwich elements according to the prior art. Here, a bottom outer layer 19 and a top outer layer 20 are transported continuously through appropriate feed devices (not shown) into the gap extending lengthwise between the rotating upper belt 21 and the rotating lower belt 22, the so-called molding section, and guided there.

The polyol component A and the isocyanate component B are transported from the respectively allocated supply vessels 23 and 24 via allocated pumps and lines to the mixing head 25, mixed there and the resulting polyurethane reaction mixture is applied on to the bottom outer layer 19 by means of the mixing head 25 traversing across the width of the bottom outer layer 19 transverse to the direction of transport. The polyurethane reaction mixture applied on to the bottom outer layer 19 foams up and is transported by the longitudinal movement of the bottom outer layer 19 into the molding section, which is held by the rotating upper belt 21 and the rotating lower belt 22. In the molding section, the polyurethane reaction mixture foams and reacts between the top outer layer 20 and the bottom outer layer 19 so that, after passing through the molding section, a polyurethane sandwich element is obtained, which can then be cut into lengths and further machined.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A device for applying a foam-forming mixture to a substrate in a manner such that the foam-forming mixture foams up uniformly over the substrate comprising:
    (a) one mixing head, in which the individual foaming components are mixed together,
    (b) a single distributor head attached to the mixing head,
    (c) at least 3 discharge lines attached to the single distributor head, the discharge ends of which are affixed to
    (d) a frame which is rigid and non-movable in which the one mixing head is attached to the frame, and the at least 3 discharge lines are affixed to the frame transverse to the direction of discharge of the foam-forming mixture, and wherein the at least 3 discharge lines are all of equal length and equal cross section and composed of the same material.

2. The device of claim 1 which comprises at least 4 discharge lines of equal length and equal cross section and composed of the same material attached to the single distributor head.

3. The device of claim 1 in which the discharge lines are affixed to the frame in such a way that the areas of the substrate that are not wetted by the foam-forming mixture being discharged are the same size.

4. The application device of claim 1 in which the discharge lines are affixed to the frame in such a way that the reaction mixture being discharged is not distributed evenly across the entire width of the substrate.

5. The device of claim 1 in which the at least 3 discharge lines are attached to the frame in such a way that the foam-forming mixture is applied on to the substrate in the direction of transport of a conveyor belt.

6. The device of claim 1 in which the discharge lines are attached to the frame in such a way that the foam-forming mixture is applied on to the substrate against the direction of transport of a conveyor belt.

* * * * *